(12) United States Patent
Harrison et al.

(10) Patent No.: US 9,278,324 B2
(45) Date of Patent: Mar. 8, 2016

(54) REACTOR AND REACTOR SYSTEM FOR HIGH TEMPERATURE AND HIGH PRESSURE REACTIONS

(75) Inventors: Brian Harrison, Kanata (CA); Hurdon A. Hooper, Fredericton (CA)

(73) Assignee: RUBRECO INC., Fredericton (CA)

( * ) Notice: Subject to any disclaimer, the term of this patent is extended or adjusted under 35 U.S.C. 154(b) by 1140 days.

(21) Appl. No.: 12/294,647

(22) PCT Filed: Mar. 27, 2007

(86) PCT No.: PCT/CA2007/000489
§ 371 (c)(1),
(2), (4) Date: Nov. 26, 2008

(87) PCT Pub. No.: WO2007/109889
PCT Pub. Date: Oct. 4, 2007

(65) Prior Publication Data
US 2011/0212003 A1    Sep. 1, 2011

(30) Foreign Application Priority Data
Mar. 27, 2006    (CA) ...................................... 2541035

(51) Int. Cl.
*B01J 3/04* (2006.01)
*C08J 11/10* (2006.01)
*B01J 19/00* (2006.01)

(52) U.S. Cl.
CPC .............. *B01J 3/046* (2013.01); *B01J 19/0013* (2013.01); *C08J 11/10* (2013.01);
(Continued)

(58) Field of Classification Search
CPC .................. B01J 3/046; B01J 19/0013; B01J 2219/00123; B01J 2219/0286; B01J 2219/0295; B01J 2219/0263; C08J 11/10

USPC ......... 422/202, 208, 242, 238, 231, 226, 295; 202/266, 96, 108, 110, 113; 201/10, 35
See application file for complete search history.

(56) References Cited

U.S. PATENT DOCUMENTS 3,130,015 A * 4/1964 Monroe ......................... 422/226
3,785,779 A * 1/1974 Li et al. ......................... 422/231
(Continued)

FOREIGN PATENT DOCUMENTS

CA    2441713    10/2004
GB    2085911    5/1982
(Continued)

*Primary Examiner* — Jill Warden
*Assistant Examiner* — Joye L Woodard
(74) *Attorney, Agent, or Firm* — Pearne & Gordon LLP

(57) ABSTRACT

A reactor and a reactor system for carrying out high temperature and high pressure reactions is disclosed herein. The reactor has an isolatable inner vessel for allowing for heat energy efficient cooling and heating of the reactor. The reactor comprises an outer reactor adapted for withstanding a reaction pressure and a reaction temperature, the outer reactor having a sealable reactor lid; an inner vessel within the outer reactor for containing a reaction solution and at least one reaction vessel, the inner vessel being open to the outer reactor such that the reaction pressure of the inner vessel and the outer reactor are substantially equalized and vapor in the inner vessel passes to the outer vessel, the inner vessel having a splatter shield for substantially preventing spillage of the reaction solution from the inner vessel into the outer reactor; a vapor injector in communication with the inner vessel for injecting vapor into the inner vessel for heating the reaction solution; an outlet in the outer vessel for exhausting vapor from the outer reactor and the inner vessel; and an outer reactor outlet for draining a liquid contained between the outer reactor and the inner vessel.

23 Claims, 3 Drawing Sheets

(52) U.S. Cl.
CPC .................. *B01J 2219/00123* (2013.01); *B01J 2219/0263* (2013.01); *B01J 2219/0286* (2013.01); *B01J 2219/0295* (2013.01); *C08J 2321/00* (2013.01); *Y02W 30/702* (2015.05)

(56) References Cited

U.S. PATENT DOCUMENTS

| | | | |
|---|---|---|---|
| 4,432,941 A | | 2/1984 | Spencer |
| 4,570,443 A | | 2/1986 | Specht |
| 5,230,777 A | * | 7/1993 | Jarrell ............................. 202/97 |
| 5,932,182 A | | 8/1999 | Blaney |
| 6,939,521 B1 | * | 9/2005 | Chiu et al. .................... 422/203 |
| 7,122,159 B2 | | 10/2006 | Van Erden et al. |
| 7,166,658 B2 | | 1/2007 | Harrison et al. |
| 2003/0202911 A1 | | 10/2003 | Van Erden et al. |
| 2007/0148320 A1 | | 6/2007 | Uchiyama |

FOREIGN PATENT DOCUMENTS

| | | |
|---|---|---|
| JP | 59-80324 | 5/1984 |
| JP | 61-125427 | 6/1986 |
| JP | 09-169582 | 6/1997 |
| WO | WO03092883 | 11/2003 |
| WO | 2005030845 | 4/2005 |

* cited by examiner

REACTOR AND REACTOR SYSTEM FOR HIGH TEMPERATURE AND HIGH PRESSURE REACTIONS

FIELD OF THE INVENTION

The present invention relates to reactors and reactor systems for high temperature and high pressure reactions.

TECHNICAL BACKGROUND

High temperature and high pressure reactions require a reactor adapted to handle such conditions. Reactions, such as the devulcanization of rubber or mineral extraction, are examples of high temperature high pressure reactions. Rubber can be devulcanized by heating it to between 250° C. and 350° C. in an aqueous solution for about one hour with pressures up to about 1500 psi as described in Canadian patent application 2,441,713 which is incorporated herein. The rubber pieces are usually relatively large as smaller pieces tend to agglomerate and become sticky when processed. Because of this, a batch type of reactor is required. The reactor required to contain the high temperatures and pressures involved is very heavy and has a very large thermal mass and therefore requires a substantial amount of heat energy to raise the temperature of the reactor up to a reaction temperature. Current reactors and reactor systems require many hours of heating to heat a reactor full of liquid up to temperature and then cool it down and are therefore not very commercially practical. Additionally, reheating of a reactor after cool-down requires a large amount of heat energy as the outer reactor wall of a high pressure reactor has a very large thermal mass.

Furthermore, heating a large reactor from the outside that is full of liquid and a material to be processed, such as rubber or in a mineral extraction from rocks or the like (that is a poor thermal conductor), also results in large temperature gradients within the reactor.

Additionally, much of the heat energy required to increase the temperature of the reactor or reactants and/or solvent to a processing temperature is lost when the reaction is complete and the reactor is cooled for removal of the reaction product.

There is therefore a need for a reactor whereby the reactant can be rapidly and evenly heated to the processing temperature, held there for a desired time period and then rapidly cooled.

SUMMARY OF INVENTION

The present invention relates to a reactor and a reactor system for processing a high temperature, high pressure reaction. Reactors of the present invention have an isolatable inner vessel allowing for efficient heating and cooling of a reaction to be carried out therein. The inner vessel is for containing a reaction solution and a reaction vessel. The inner vessel may be thermally isolated from an outer reactor through which heat may be constantly applied. A separate vapour injector for providing additional heating energy via vapour directly to the inner vessel is used to bring the temperature of the reaction solution up to a reaction temperature. During a cool-down phase of the reaction, any liquid between the inner vessel and the outer reactor is removed thereby isolating the inner vessel from the outer reactor. Vapour inside the reactor is then exhausted. Lowering of the reactor pressure causes the liquid inside the inner reactor to evaporate. The evaporation of the liquid causes cooling and the liquid in the inner vessel is cooled by the process of exhausting the vapour from the reactor. Upon pressure equalization with the outside atmosphere the reactor will be at a suitable temperature and may be opened and the reaction vessels removed. In this way cool-down of the reaction product can be done quickly and re-heating of the reactor does not require substantial re-heating of the outer reactor. In the reaction system, exhausted vapour may be reused to heat a reaction solution of an additional reactor thereby recovering a portion of the heat energy.

One aspect of the present invention provides for a reactor comprising:

an outer reactor adapted for withstanding a reaction pressure and a reaction temperature, the outer reactor having a sealable reactor lid;

an inner vessel within, and thermally isolated from, the outer reactor for containing a reaction solution and at least one reaction vessel, the inner vessel being open to the outer reactor such that the reaction pressure of the inner vessel and the outer reactor are substantially equalized and vapour in the inner vessel passes to the outer vessel, the inner vessel having a splatter shield for substantially preventing spillage of the reaction solution from the inner vessel into the outer reactor;

a vapour injector in communication with the inner vessel for injecting vapour into the inner vessel for heating the reaction solution;

an outlet in the outer vessel for exhausting vapour from the outer reactor and the inner vessel; and a reaction solution outlet for draining the reaction solution from the inner vessel.

Another aspect of the present invention provides for a reactor system for transferring heat energy from at least a first reactor to a second reactor, the reactor system comprising:

the first and second reactors each comprising:

an outer reactor adapted for withstanding a reaction pressure and a reaction temperature, the outer reactor having a sealable reactor lid;

an inner vessel within, and thermally isolated from, the outer reactor for containing a reaction solution and at least one reaction vessel, the inner vessel being open to the outer reactor such that the reaction pressure of the inner vessel and the outer reactor are substantially equalized and vapour in the inner vessel passes to the outer vessel, the inner vessel having a splatter shield for substantially preventing spillage of the reaction solution from the inner vessel into the outer reactor;

a vapour injector in communication with the inner vessel for injecting vapour into the inner vessel for heating the reaction solution;

a reaction solution outlet for draining the reaction solution from the inner vessel; and an outlet in the outer vessel for exhausting vapour from the outer reactor and the inner vessel; and a manifold in communication with the outlet of each reactor and the vapour injector of each reactor for transferring vapour from the first reactor to the second reactor to heat the reaction solution.

DETAILED DESCRIPTION

Reactors of the present invention are known as batch type reactors and are used for processing high temperature and high pressure reactions such as the devulcanization of rubber or mineral separation from rocks or the like. However, reactors of the present invention may also be used for processing lower temperature and/or lower pressure reactions.

Reactors of the present invention allow for quicker cool-down of reaction product by isolating the reaction product in a reaction vessel held in an inner vessel of the reactor away from the outer reactor wall which in standard commercial use is constantly heated. Heat energy recovery from a reactor of the present invention is also possible in a reactor system comprising reactors as, for example, those outlined below.

Reactor

Figure 1:
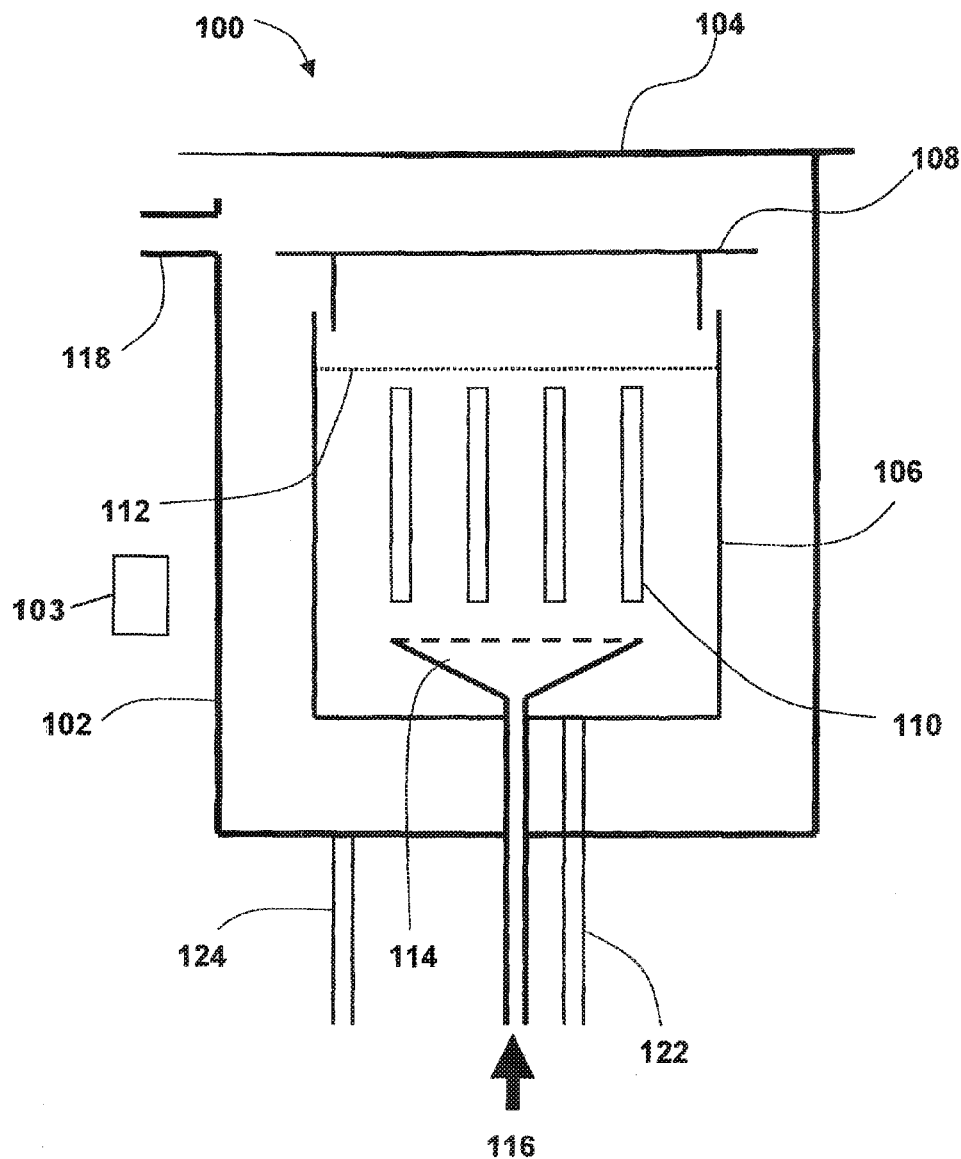
FIG. 1 is an illustrative schematic diagram of a batch reactor according to one embodiment of the present invention.

FIG. 1 is an illustrative schematic diagram showing a reactor 100 according to one embodiment. The reactor 100 has an outer reactor 102 for withstanding a reaction pressure of a reaction to be carried out within the reactor 100. The outer reactor 102 is also adapted to withstand a reaction temperature of the reaction to be carried out within the reactor 100. The reaction pressure for a typical devulcanization reaction is about 1500 psi and the reaction temperature for a typical devulcanization reaction can be as high as about 350° C.

The reactor 100 has a reactor lid 104 sealably connected to the outer reactor 102. Through the reactor lid 104 the interior of the reactor 100 can be accessed to, for example, retrieve reaction product, perform maintenance, install reaction vessels, input reaction solution, input heat transfer liquid, etc. Any suitable seal may be used which can withstand the temperature and pressure experienced by the outer reactor 102.

Within the outer reactor 102 is an inner vessel 106. The inner vessel 106 is adapted to contain a reaction solution 112, for example water, which can be heated. The inner vessel 106 is also adapted to contain at least one reaction vessel 110 for containing reactants to be reacted and reaction product which is generated. However, in standard use, a plurality of reaction vessels 110 will be situated in the inner vessel 106 and in the reaction solution 112. The reaction vessels 110, depending on their structure may be either fully submerged or partially submerged in the reaction solution 112. A space between the outer reactor 102 and the inner vessel 106 may be filled with either an inert gas (optionally pressurized), a heat transfer liquid for transmitting heat from the outer reactor 102 to the inner vessel 106 or insulation. Any liquid in the space may be removed via an outer reactor outlet 124 in a cooling phase of the reaction thereby isolating the inner vessel 106 from the outer reactor 102. This allows for cool-down of the inner vessel 106 without the need for cooling the outer reactor 102.

During cool-down of the reactor 100, high pressure vapour may be exhausted from the outer reactor 102. When this is done, the pressure in the reactor 100 is reduced and liquid in the inner vessel 106 begins to boil and evaporate. This evaporation causes cooling of the inner vessel 106 and the reaction solution 112 therein as well as the reaction vessels 110 therein. However, evaporation and boiling of the reaction solution 112 can lead to spillage of the reaction solution 112 into the outer reactor 102. In order to prevent spillage of the reaction solution 112 into the outer reactor 102 a splatter shield 108 is used. The splatter shield 108 and the inner vessel 106 work in combination to contain the reaction solution 112, however, the combination is not sealed from the outer reactor 102 but is open to the outer reactor 102 and the reaction pressure within the reactor is equalized between the inner vessel 106 and the outer reactor 102. Additionally, vapour injected into the inner reactor 106 may also pass to the outer reactor 102 between the splatter shield 108 and the inner vessel 106, as will be discussed in more detailed below.

In order to allow for quicker cool-down of the reaction vessels 110 in the inner vessel 106 without the need for cooling the outer reactor 102, which has a large thermal mass and would therefore require a long time to cool down and a large amount of heat energy to re-heat following cool-down, the inner vessel 106 is additionally heated by a second heat source. A vapour injector 114 having a nozzle outlet positioned in the inner vessel 106 provides for heating vapour 116 for heating the reaction solution 112 in the inner vessel 106. The vapour injector 114 is submerged in the reaction solution 112 and is generally located below the reaction vessels 110. The vapour injector 114 will inject vapour 116 into the reaction solution 112. The injection of vapour 116 using the vapour injector 114 provides a convenient method of mixing the solution in the inner vessel 106 and maintaining a substantially uniform temperature throughout the liquid. To optimize the heating and mixing of the solution in the inner vessel 106, the injector 114 and the nozzle outlet may distribute the injection of the vapour 116 substantially over the entire cross-section of the inner vessel 106 or a majority of the cross-section of the inner vessel 106 to optimize the condensation of the vapour in the liquid.

The reactor may be pressurized with an inert gas to facilitate the condensation of the vapour 116 in the inner vessel 106.

A reaction solution outlet 122 may be used for draining the reaction solution 112 from the inner vessel 106 when the inner vessel 106. This can be done either following cool-down of the reactor 100 in order to empty the inner vessel 106. Alternatively, this can be done during cool-down, and the heated reaction solution 112 can be stored and the pre-heated solution can be reused thereby reducing the amount of heat energy required to heat the reused reaction solution to reaction temperatures. When done during cool-down, cooling water must be added to the inner vessel 106 to reduce the temperature of the reaction vessels 110 for their removal from the reactor 100. Depending on the type of reaction vessel 110 used, the reaction solution 112 may contain reaction product in which case the reaction solution outlet 122 may direct the reaction solution 112 to a collection device for collecting any reaction product in the reaction solution.

Additionally, the reaction solution outlet 122 may not be a separate element of the reactor 100 but may be incorporated into the vapour injector 114.

A typical reaction cycle using a reactor 100, such as that described above, involves the constant heating, via heating means 103, of the outer reactor 102. As outlined above, the outer reactor 102 is a large thermal mass and therefore it is advantageous to maintain the outer reactor 102 at a substantially high temperature and near the reaction temperature. Heat applied to the outer reactor 102 is radiated to the inner vessel 106 usually using a heat transfer liquid. Reaction solution 112 is pumped into the inner vessel after placement of the reaction vessels 110. The reaction solution 112 is heated via the outer reactor 102. Additional heat is provided in the form of vapour 116 through the vapour injector 114 to heat the reaction solution 112 to the reaction temperature. Upon completion of the reaction the reaction may be cooled so that the reactor lid 104 may be opened and the reaction product can be retrieved. Cool-down of the reaction is carried out first by draining any liquid in the outer reactor 102. The high pressure vapour is then exhausted from the reactor 100 via outlet 118 thereby causing evaporation and cooling of the reaction solution 112 in the inner vessel 106. By doing so, the inner vessel 106 and the reaction vessels 110 are isolated from the outer reactor 102 and thus the heat which is constantly applied to the outer reaction 102 thereby allowing for a quicker cool-down of the reaction product. Once the pressure in the reactor 100 has substantially equalized with the outside atmospheric pressure, the temperature of the interior of the reactor is usually suitable for opening of the reactor lid 104 and retrieval of the reaction vessels 110. Exhausted vapour may be reused as discussed below with reference to FIG. 2.

The reaction vessels 110 generally have an open structure such as a wire basket, perforated metal or the like. The reaction vessels 110 may be sealed from the reaction solution 112 and may simply be heated by the reaction solution 112. Additionally, the reaction vessels 110 may contain the reactants and reaction products in the reaction vessel 110 itself, separate from the liquid in the inner reactor (i.e. the reaction vessel 110 is completely sealed or vented through a hole at the top versus a wire cage). This keeps almost all the contamination inside the reaction vessel 110 and corrosion resistant materials become more of an issue for the reaction vessels 110 than the inner reactor 106. It also becomes easier to add various chemicals to facilitate the reaction without affecting the reactor, valves, etc. When using a reaction vessel 110 having a hole at the top, the reaction vessel 110 is only partially submerged in the reaction solution 112 so that heat is radiated into the reaction vessel 110 and most of the contaminates in the reaction vessel 110 do not leak out and contaminate the reaction solution 112 and the inner vessel 106. It will be apparent to one skilled in the art that the invention is not limited to the number of reaction vessels 110 that are located within the inner vessel 106.

The inner vessel 106 may be made out of a number materials to prevent corrosion based on the type of reaction to be carried out therein as well as the reaction temperatures. For example, the inner vessel 106 may be made from Inconel® Ni—Cr, Ni—Cr—Fe, and Ni—Cr—Mo alloys or Monel® Ni—Cu alloys. These are only two out of a range of materials that offer some corrosion resistance for the inner vessel if it is required. At lower reaction temperatures, the inner vessel 106 may be made from plastic, while at higher temperatures stainless steel may be used. If corrosion is not a big concern, carbon steel may be used. One of skill in the art will understand that many types of material and thicknesses of material may be used for withstanding temperature, pressure and corrosion based on the reactions to be carried out in the reactor 100, the life expectancy of the reactor and the budget for the reactor 100.

Additionally, the reaction vessels 110 may be made of the corrosion and pressure resistant materials outlined above.

Reactor System

Figure 2:
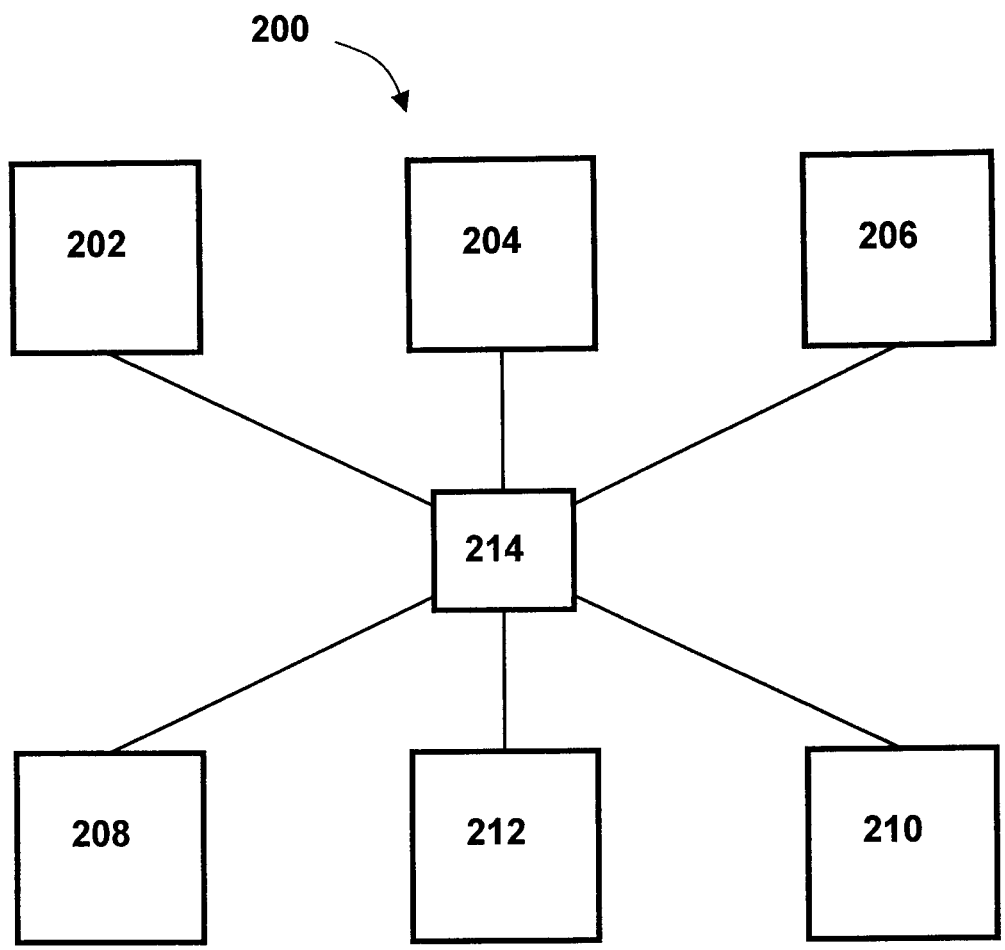
FIG. 2 is an illustrative schematic diagram of a multiple reactor system according to one embodiment of the present invention having an energy recovery system.

FIG. 2 is an illustrative schematic diagram of one embodiment of a reactor system 200 according to one aspect of the present invention. The reactor system 200 comprises a plurality of reactors 202, 204, 206, 208 and 210 such as that outlined above with reference to FIG. 1. Additionally, the reactor system 200 may comprise a reaction solution reservoir 212 for containing reaction solution to be used in the reactors of the reactor system 200. The reaction solution may be, for example, water or another suitable solution. High pressure vapour from each of the reactors 202, 204, 206, 208 and 210 may be transferred between the reactors and the reservoir 212 through the outlet 118 in the reactors via a manifold 214 which distributes the vapour to the desired reactor for injection via the vapour injector for reuse in heating reaction solution.

When used in a reactor system 200 comprising the plurality of reactors 202, 204, 206, 208 and 210, such as reactor 100 described above, the exhausted vapour may be distributed via a manifold 214 to either another of the plurality of reactors and reused to heat the reaction solution of the that reactor and/or can be used to heat a reservoir 214 containing reaction solution to be used in a reaction.

In the reactor system 200, once a reaction is complete and a cool-down phase is desired, any liquid in the outer reactor 102 is removed using, for example, an outer reactor outlet 124. The high pressure vapour is then exhausted out of the first reactor through the outlet 118 and through the manifold 214 to another of the reactors until the pressure between the reactors is equalized. As outlined above, this process causes evaporation and cooling in the first reactor. The reactor pressure in the first reactor will still be above atmospheric pressure and therefore remaining high pressure vapour from the first reactor, in which the cool-down phase is in effect, may be applied to the reaction solution reservoir thus relieving the remaining pressure in the first reactor until the pressure is reduced to substantially atmospheric pressure and the temperature of at least the inner reactor 106 is below about 100° C. and the reactor lid 104 may be opened.

In this manner, heat energy is preserved as the vapour is reused to heat both the reaction solution of another reactor as well as reaction solution in the reservoir 212. Less heat energy is required to be transmitted through the outer reactor 102 to heat the inner vessel 106 of the reactor 100. The reaction solution 112 is thereby heated more quickly and more efficiently using such a reactor system. Additionally, because the inner vessel 106 and the reaction vessels 110 therein are isolated from the outer reactor 102 and the heat transmitted therethrough, they may be cooled down more quickly and effectively during the cool-down phase.

Figure 3:
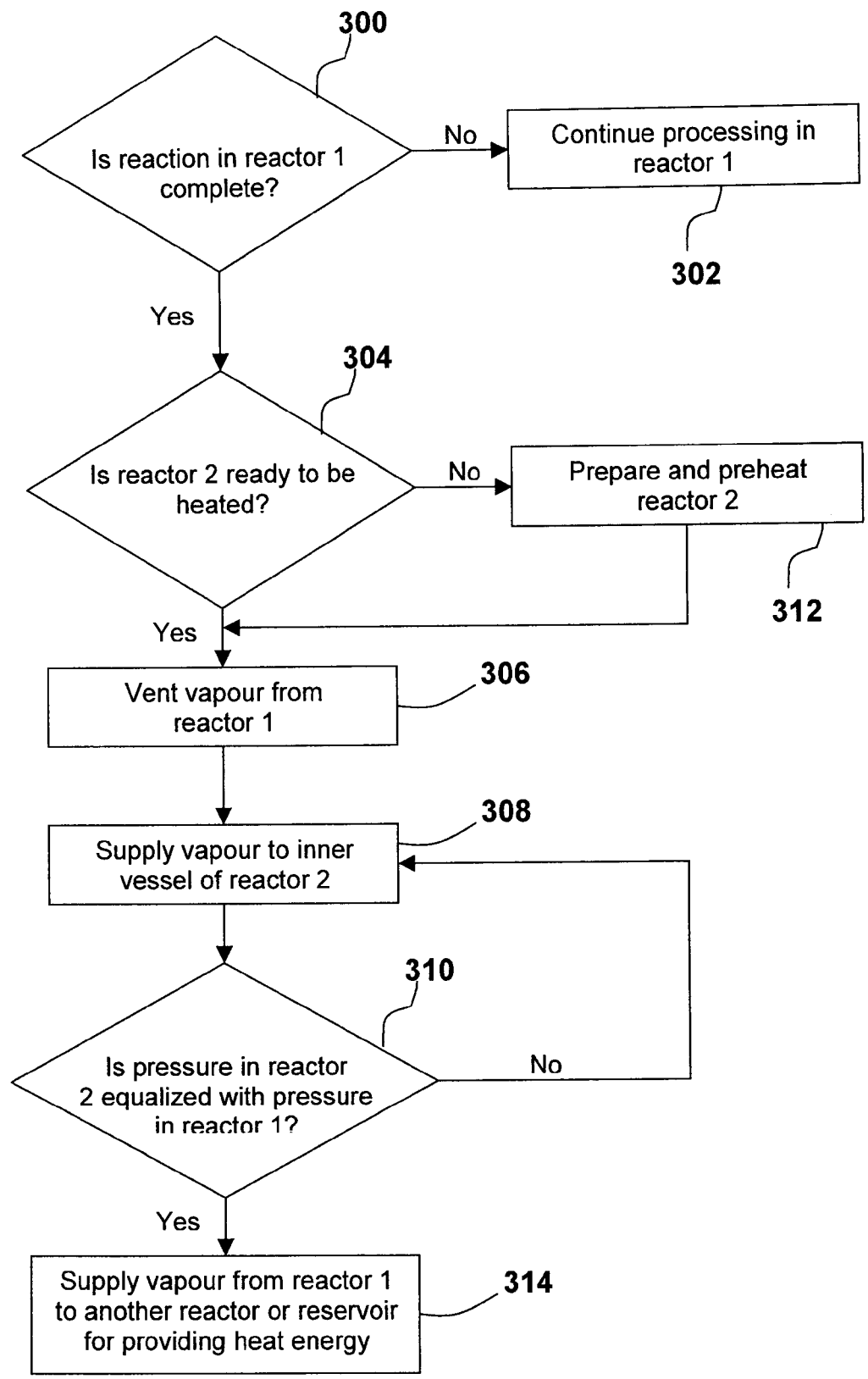
FIG. 3 is a flow chart illustrating a method of providing energy recovery in a multiple reactor system according to one embodiment of the present invention.

FIG. 3 is an illustrative flowchart of a reaction process according to one embodiment of the invention using a multiple reactor system of high temperature high pressure reactors such as that described with reference to FIG. 2. An example of the reaction process will be described with regard to the flowchart of FIG. 3.

In this example the reaction liquid is water, and reactor 1 is at 300° C. At step 300 it is determined whether the reaction is complete and reactor 1 is ready to proceed to the cooling phase. If the reaction is not complete the reaction is continued at step 302 until it is determined that the reaction should proceed to the cool-down phase. If the reactor is ready to be cooled it is determined if reactor 2 is ready to be heated at step 304. For reactor 2 to be ready for heating it should have the reaction vessels in place and already be pre-heated to a temperature of approximately 150° C. using heating through the outer reactor 102. If the reactor is not ready to be heated, the reactor is preheated at step 312. When reactor 2 is ready for heating, high pressure vapour is vented from reactor 1 at step 306 and is provided to reactor 2 at step 308. This can be done by exhausting vapour out of the reactor outlet 118 and directing the vapour to reactor 2 via the manifold 214. By providing vapour from reactor 1 to reactor 2 the temperature of the inner vessel of reactor 2 can be increased from the pre-heating temperature of approximately 150° C. to approximately 225° C. as the steam condenses in the liquid in the inner vessel of reactor 2. At the same time the venting of vapour causes liquid in the inner vessel of reactor 1 to evaporate thereby cooling the vessel from the reaction temperature of, for example, about 300° C. to about 225° C.

At step 310 it is determined if the pressure in reactor 2 has been equalized with that in reactor 1. If it has not been equalized the supply of vapour to reactor 2 is continued. Once the pressure in the two reactors has been equalized, remaining high pressure vapour in reactor 1 is exhausted and can be used to pre-heat another reactor from about 100° C. to about 150° C. or additionally or alternatively, any remaining vapour may be used to heat reaction solution in a reservoir for use in other reactors in step 314. Venting the remaining high pressure vapour from reactor 1 reduces the pressure in reactor 1 to about atmospheric pressure and reduces the temperature of the reactor to below about 100° C. The reactor lid of reactor 1 may then be opened and the reaction product may be removed.

In this way a considerable amount of heat energy is recovered. Heat energy is only then required to heat the inner vessel of reactor 2 from, for example about 225° C. to a reaction temperature of, for example, 300° C., and not the entire reactor from about 25° C. to about 300° C. Once the process of recovering energy has been completed (e.g. the inner vessel of reactor 2 is at about 225° C.) additional heat can be added by various means including injecting additional vapour into reactor 2 until it is at its operating temperature. An advantage of adding vapour is that the injection causes turbulence in the liquid, facilitates mixing, and produces a much more even temperature.

In accordance with one embodiment of the invention, an example of an overall reaction process for one method of the devulcanization of rubber may comprise the following steps:

1. Chop or grind tires or materials to be processed into pieces.
2. Load into reaction vessels.
3. Pre-heat processing/bulk liquid (e.g. up to 100° C.) with vapour as per step 314.
4. If using closed reaction vessels, add processing liquid (which can be different to the liquid in the inner vessel (e.g. liquid plus additives)) to the sample container.
5. Load sample containers into inner vessel.
6. With either open or closed sample containers add pre-heated reaction solution to the inner vessel.
7. Close reactor lid.
8. Pre-heat reaction solution with radiant heat via the outer reactor and/or recycled vapour from another reactor to pre-heat temperature (e.g. 100-150° C.).
9. If required fill space between inner and outer vessel with liquid or heat transfer fluid.
10. Add heating vapour (from separate source) to bring inner vessel to reaction temperature.
11. Maintain temperature for required period.
12. Exhaust vapour from the reactor via the outlet to reduce reactor temperature and pressure and provide reusable vapour to another reactor via the manifold.
13. Once pressure of the reactors have equalized, relieve remaining pressure by using vapour from the reactor to pre-heat reaction solution reservoir.
14. Remove the sample containers from the outer reactor.

In an alternative embodiment the reaction solution may be an aqueous solution comprising a solute and a solvent, an organic liquid or a combination thereof.

The samples could be vulcanized rubber or other material requiring high temperature and pressure processes.

In a further alternative embodiment the rubber or other materials to be processed are in a sealed container, or vented container with the vented container having a certain size hole in it to equalize the pressure and control evaporation of the liquid in the container at the end of the cycle. This type of container can contain the reactants from the liquid in the inner vessel. In this embodiment additives may be used in the reaction solution that are contained within the sample containers themselves and kept away from the bulk liquid in the inner vessel. For example, additives to facilitate the devulcanization process and allow it to occur at lower temperatures or ensure reaction by-products are contained may be added to the sample containers.

The present invention has been described with regard to a plurality of illustrative embodiments. However, it will be apparent to persons skilled in the art that a number of variations and modifications can be made without departing from the scope of the invention as defined in the claims.

We claim:

1. A reaction apparatus comprising:
   an outer reactor adapted for withstanding a reaction pressure and a reaction temperature, the outer reactor having a sealable reactor lid;
   means for applying heat to an outer surface of the outer reactor;
   an inner reactor within, and thermally isolated from, the outer reactor for containing a reaction solution and at least one reaction vessel, the inner reactor being open to the outer reactor such that the reaction pressure of the inner reactor and the outer reactor are substantially equalized and vapour in the inner reactor passes to the outer reactor, the inner reactor having a splatter shield for substantially preventing spillage of the reaction solution from the inner reactor into the outer reactor;
   a vapour injector in communication with the inner reactor for injecting vapour into the inner reactor for heating the reaction solution and positioned within a lower portion of the inner vessel to be below the at least one reaction vessel when contained within the inner reactor;
   a vapour outlet in the outer reactor for exhausting vapour from the outer reactor and the inner reactor; and
   an outer reactor outlet for draining a liquid contained between the outer reactor and the inner reactor.

2. The reaction apparatus of claim 1, further comprising:
   a reaction solution outlet for draining the reaction solution from the inner reactor.

3. The reaction apparatus of claim 2, wherein the vapour injector comprises the reaction solution outlet.

4. The reaction apparatus of claim 2, wherein the reaction solution outlet directs the reaction solution to a collector for collecting any reaction product contained in the reaction solution.

5. The reaction apparatus of claim 1, wherein the vapour injector comprises a nozzle adapted to release vapour across a majority of the cross section of the inner reactor.

6. The reaction apparatus of claim 1, wherein the vapour outlet is in communication with a manifold for distributing the vapour from the reactor.

7. The reaction apparatus of claim 1, wherein the inner reactor comprises an alloy selected from the group consisting of Inconel, Monel, carbon steel and stainless steel.

8. The reaction apparatus of claim 1, wherein the inner reactor comprises a plastic.

9. A method of cooling a reaction apparatus, the reaction apparatus as defined in claim 1, the method comprising the steps of:
   draining, during constant heating of an outer surface of the outer reactor, any liquid contained between the outer reactor and the inner reactor thereby thermally isolating the inner reactor from the outer reactor;
   exhausting high pressure vapour from the reactor into a second reaction apparatus until a pressure in the reaction apparatus substantially equalizes with a pressure in the second reaction apparatus, thereby cooling the reaction solution within the thermally isolated inner vessel by evaporation; and
   exhausting remaining high pressure vapour in the reaction apparatus into either the atmosphere or a third heatable source until the reactor pressure is substantially atmospheric pressure.

10. The method of claim 9, further comprising the step of: opening the sealable reactor lid and removing a reaction product from the reaction apparatus.

11. The method of claim 9, wherein the third heatable source is a reaction solution reservoir or a third reaction apparatus.

12. A reactor system for transferring heat energy from at least a first reaction apparatus to a second reaction apparatus, the reactor system comprising:
the first and second reaction apparatuses each comprising:
an outer reactor adapted for withstanding a reaction pressure and a reaction temperature, the outer reactor having a sealable reactor lid;
an inner reactor within, and thermally isolated from, the outer reactor for containing a reaction solution and at least one reaction vessel, the inner reactor being open to the outer reactor such that the reaction pressure of the inner reactor and the outer reactor are substantially equalized and vapour in the inner reactor passes to the outer reactor, the inner reactor having a splatter shield for substantially preventing spillage of the reaction solution from the inner reactor into the outer reactor;
a vapour injector in communication with the inner reactor for injecting vapour into the inner reactor for heating the reaction solution;
an outer reactor outlet for draining a heating solution contained between the outer reactor and the inner reactor; and
a vapour outlet in the outer reactor for exhausting vapour from the outer reactor and the inner reactor; and
a manifold in communication with the vapour outlet of each reaction apparatus and the vapour injector of each reaction apparatus for transferring vapour from the first reaction apparatus to the second reaction apparatus to heat the reaction solution.

13. The reactor system of claim 12, further comprising a reaction solution reservoir for containing reaction solution and wherein the manifold is additionally in communication with the reaction solution reservoir such that vapour from each reaction apparatus can be used to heat the reaction solution in the reaction solution reservoir.

14. The reactor system of claim 12, wherein the reaction apparatuses further comprise:
a reaction solution outlet for draining the reaction solution from the inner reactor.

15. The reactor system of claim 14, wherein the vapour injector of each of the reaction apparatuses comprises the reaction solution outlet.

16. The reactor system of claim 14, wherein the reaction solution outlet of each of the reaction apparatuses directs the reaction solution to a collector for collecting any reaction product contained in the reaction solution.

17. The reactor system of claim 12, wherein the vapour injector of each of the reaction apparatuses is positioned within a lower portion of the inner reactor to be below the at least one reaction vessel when contained within the inner reactor of each of the reaction apparatuses.

18. The reactor system of claim 17, wherein the vapour injector comprises a nozzle adapted to substantially evenly heat the reaction solution.

19. The reactor system of claim 12, wherein the vapour injector of each of the reaction apparatuses is positioned within a lower portion of the inner reactor to be below the at least one reaction vessel when contained within the inner reactor of each of the reaction apparatuses and comprises a nozzle adapted to release vapour across a majority of the cross section of the inner reactor of the respective reaction apparatus.

20. The reactor system of claim 12, wherein the inner reactor of each of the reaction apparatuses comprises an alloy selected from the group consisting of Inconel, Monel, carbon steel and stainless steel.

21. The reactor system of claim 12, wherein the inner reactor of each of the reaction apparatuses comprises a plastic.

22. A method of carrying out a reaction in a reactor system as defined in claim 12, the method comprising:
carrying out a first reaction in the first reaction apparatus at a high temperature and high pressure;
draining any liquid contained between the outer reactor and the inner reactor of the first reaction apparatus to thermally isolate the inner reactor from the outer reactor when the first reaction is completed;
exhausting high pressure vapour from the first reaction apparatus into the second reaction apparatus through the manifold and vapour injector of the first reaction apparatus to thereby heat the reaction solution in the second reaction apparatus and cool the reaction solution within the thermally isolated inner vessel of the first reaction apparatus by evaporation; and
carrying out a second reaction in the second reaction apparatus at a high temperature and high pressure.

23. The method of claim 22, wherein both the first and second reactions are devulcanization of rubber reactions.

\* \* \* \* \*